(12) United States Patent
Dragone et al.

(10) Patent No.: US 10,586,077 B2
(45) Date of Patent: Mar. 10, 2020

(54) RADIO-ASSISTED TAMPER PROTECTION OF HARDWARE

(71) Applicant: International Business Machines Corporation, Armonk, NY (US)

(72) Inventors: Silvio Dragone, Winterthur (CH); Mircea Gusat, Langnau a.A. (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 15/271,284

(22) Filed: Sep. 21, 2016

(65) Prior Publication Data
US 2018/0083993 A1  Mar. 22, 2018

(51) Int. Cl.
| | |
|---|---|
| G06F 21/72 | (2013.01) |
| H04L 9/08 | (2006.01) |
| H04L 9/00 | (2006.01) |
| G06F 21/86 | (2013.01) |
| G06F 21/57 | (2013.01) |

(52) U.S. Cl.
CPC .............. G06F 21/72 (2013.01); G06F 21/57 (2013.01); G06F 21/86 (2013.01); H04L 9/002 (2013.01); H04L 9/0861 (2013.01); H04L 9/0897 (2013.01); H04L 2209/127 (2013.01)

(58) Field of Classification Search
CPC ................................. G06F 21/57; G06F 21/72
See application file for complete search history.

(56) References Cited

U.S. PATENT DOCUMENTS

| | | | |
|---|---|---|---|
| 8,683,222 B2 | 3/2014 | Yellepeddy et al. | |
| 9,344,993 B2 * | 5/2016 | Pitt | H04W 64/006 |
| 9,477,825 B1 * | 10/2016 | Sinchak | H04W 12/04 |
| 9,596,600 B2 * | 3/2017 | Hernandez | H04W 12/06 |
| 2002/0184418 A1 * | 12/2002 | Blight | G01C 21/20 710/100 |
| 2009/0085761 A1 * | 4/2009 | Buer | G06Q 20/4016 340/686.1 |
| 2010/0100972 A1 * | 4/2010 | Lemieux | G06F 21/57 726/34 |
| 2010/0225380 A1 | 9/2010 | Hsu et al. | |
| 2010/0283604 A1 | 11/2010 | Sakai | |
| 2013/0281120 A1 * | 10/2013 | Oka | H04W 64/00 455/456.2 |

(Continued)

OTHER PUBLICATIONS

Han, Gel; Klinker, Gudrun J.; Ostler, Daniel; Schneider, Armin; "Testing a proximity-based location tracking system with Bluetooth Low Energy tags for future use in the OR", 17th International Conference on E-health Networking, Application & Services (HealthCom), IEEE, Oct. 14-17, 2015, pp. 17-21.*

(Continued)

Primary Examiner — Victor Lesniewski
(74) Attorney, Agent, or Firm — Cantor Colburn LLP; Daniel Morris (57) ABSTRACT

Radio-assisted tamper protection in a HSM electronic device. Radio signals received from one or more network elements on a network are used for determining values of a set of network parameters that identify the electronic device in a predefined state. A tamper detection state signal may be generated responsive to the detected tampering state. The electronic device may be inhibited from operation in response to the tamper detection state signal.

15 Claims, 5 Drawing Sheets

(56) References Cited

U.S. PATENT DOCUMENTS

| | | | | |
|---|---|---|---|---|
| 2014/0059347 | A1* | 2/2014 | Dougherty | H04W 12/06 713/168 |
| 2014/0108786 | A1* | 4/2014 | Kreft | G06F 21/71 713/156 |
| 2015/0091547 | A1* | 4/2015 | Vasilev | G07F 19/2055 324/76.45 |
| 2015/0148055 | A1* | 5/2015 | Alles | G01S 5/0036 455/456.1 |
| 2015/0327015 | A1* | 11/2015 | So | H04W 4/029 455/457 |
| 2015/0327208 | A1* | 11/2015 | Qiu | H04W 12/10 455/456.1 |
| 2016/0004867 | A1 | 1/2016 | Gillespie et al. | |
| 2016/0012653 | A1* | 1/2016 | Soroko | G07C 9/00007 340/5.61 |
| 2016/0055690 | A1* | 2/2016 | Raina | G07C 9/00007 340/5.61 |
| 2016/0359825 | A1* | 12/2016 | Chand | G05B 19/048 |
| 2017/0353435 | A1* | 12/2017 | Pritikin | G06Q 30/018 |
| 2018/0005243 | A1* | 1/2018 | Zovi | G06Q 20/4016 |
| 2018/0075259 | A1* | 3/2018 | Manapragada | G06F 21/72 |

OTHER PUBLICATIONS

Ji, Myungin; Kim, Jooyoung; Jeon, Juil; Cho, Youngsu; "Analysis of Positioning Accuracy corresponding to the number of BLE beacons in Indoor Positioning System", 17th International Conference on Advanced Communication Technology (ICACT), IEEE, Jul. 13, 2015, pp. 92-95.*

Bisio, Igor; Sciarrone, Andrea; Zappatore, Sandro; "Asset Tracking Architecture with Bluetooth Low Energy Tags and ad hoc Smartphone Applications", European Conference on Networks and Communications (EuCNC), IEEE, Jun. 29-Jul. 2, 2015, pp. 460-464.*

Smith, "Tamper-Event Detection Using Distributed Scada Hardware," TCIPG Building a more secure and resilient power grid, Accessed online: Sep. 6, 2016, 3 pages, University of Illinois Board of Trustees, Urbana, IL. URL: https://tcipg.org/research_TED.

* cited by examiner

RADIO-ASSISTED TAMPER PROTECTION OF HARDWARE

BACKGROUND

The present invention relates to techniques for improving the tamper-resistibility of hardware, especially, to a radio assisted method for resisting and detecting tampering in a HSM device.

A Hardware Security Module (HSM) refers to a piece of hardware and associated software/firmware that may be attached to the inside of a PC or server and provides at least the minimum of cryptographic functions. HSM devices act as trust anchors that protect the cryptographic infrastructures by securely managing, processing and storing cryptographic keys on the physical device itself.

HSM devices with tamper protection mechanism integrated at least one sensor in order to detect any kind of penetration or tampering. Most of these physical sensors can be tricked or bypassed when enough time can be spent for an attempt. The content of an HSM device is thus potentially endangered when physically removed from its originated system.

Therefore, there is a need to improve the means for detecting the physical tampering of the HSM devices, such as by means of physical penetration.

SUMMARY

Various embodiments provide a method for resisting and detecting tampering in a HSM device, HSM device and computer program product as described by the subject matter of the independent claims. Advantageous embodiments are described in the dependent claims. Embodiments of the present invention can be freely combined with each other if they are not mutually exclusive.

In one aspect, the invention relates to a method for resisting tampering in a HSM electronic device. The HSM electronic device may also be referred to as a HSM device or a HSM. The method comprises: receiving radio signals (e.g. free space EM waves, electrical or optical) from a network element of at least one network; using the received radio signals for determining values of a set of network parameters that identify the HSM electronic device in a predefined state within the at least one network; detecting a tampering state of the HSM electronic device using the parameter values; generating a tamper detection state signal responsive to the detected tampering state; and inhibiting operation of the HSM electronic device responsive to the tamper detection state signal.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a HSM tamper resistant electronic device having a set of chipsets each being configured for determining values of a parameter that identifies the electronic device within a network. The device comprises: a detector configured to detect a tampering state of the electronic device using the parameter values; a tamper detection state signal generator configured to generate a tamper detection state signal responsive to the detected tampering state; and an inhibitor configured to inhibit operation of the electronic device responsive to the tamper detection state signal.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The network may comprise a wireless network such as a personal area network (WPAN), WLAN, LTE, GSM, Iridium etc. The network element may for example comprise an access point of the wireless network such as a base station in a GSM network, GPS satellite in a GPS/Glonass/Galileo network or Bluetooth device in a personal area network, or UWB, NFC etc. The GPS network may be controlled or defined by one or more space satellites.

The received radio signals may be radio frequency (RF) signals such as beacon signals. In another example, the method may further comprise receiving local EM noise signals or profiles of a given location (e.g. as a less trusted secondary EM signature) where the HSM device may be located as desired or as expected, and determining noise parameters values in the predefined stated. The noise parameters may for example comprise the level, amplitude, energy, frequency, and/or phase of the noise signals. The tampering state may be detected by using the network parameters as described herein and the noise parameters. For example, the determined values of the noise parameters in the predefined stated may be used as noise parameters reference values and may be compared with regularly measured noise parameter values so as to determine whether a tampering state is there or not (using comparison methods as described herein with the network parameters). If, for example, using the values of the set of network parameters the tampering state is detected, the noise parameters may optionally further be used in order to confirm the tampering state. The tampering state may be detected if the reference values of the network parameters and/or the noise parameters do not match the currently measured values of the network parameters and the noise parameters respectively.

The predefined state may be a state in which the tamper resistant system is running on normal or expected conditions or having a normal operation as certifiable by a trusted authority. The predefined state may be defined by a predefined spatial location of the HSM device e.g. the location of the computer that contains the HSM device. For example, the set of parameters may be determined when the HSM electronic device is in an initial or expected position as defined by the user. The predefined state is a state different from the tampering state.

The network parameter may comprise an operation parameter. The operation parameter is indicative of the at least one of the network, the network element and the HSM device. The operation parameters may for example comprise SSID, network address of the network element, the network operator of the network etc. The values of the network parameter may be specific to or depend on the location of the HSM device as the network parameter may for example provide access point information or the network element information of the access point that services the HSM device. The set of network parameters may comprise multiple parameters for each network of the at least one network. For example, the at least one network may comprise multiple networks, wherein the set of network parameters comprises multiple subsets of network parameters. Each subset of the multiple subsets is associated with (or indicative of) a respective network of the multiple networks. A subset of parameters of the multiple subsets of parameters may comprise one or more parameters.

The next generation crypto card has much higher thermal demands and space constraints than its predecessors and therefore enhancement needs to be made to allow new functions and increased security. The existing anti-intrusion barrier might not be enough to secure those crypto cards.

The present method may make use of publicly and privately available ether or radio tags for localization. Signatures available in the environment of the HSM device may be used. A third party may not be able to fake those signatures. This may thus prevent card to be physically removed from its designated location.

The present method may enhance the standard tamper sensors of an HSM device by radio sensors. Many different ether networks exist and are publicly available. A characteristic of such networks is that senders have—at least locally—unique network parameters such as id/tag. Examples of such networks are WLAN, GSM, GPS, Bluetooth etc.

The present method may provide physical protection of the HSM devices via tamper evidence and tamper protection mechanism that is based on radio signals of networks to which the HSM devices can connect. The present method may further have the advantage of increasing the tamper resistance for HSM devices using additional channels with multiple parameters that render the physical tampering harder compared to prior art methods. The present method may enhance exiting methods by not allowing the HSM device to be dislocated, where the equipment for a successful tamper might be available.

The present HSM device may enable an improved onboard, secure cryptographic key generation and secure cryptographic key storage and management.

The HSM device may scan all possible id/tags—that can be measured by its receivers—of its environment and monitor them constantly whether they are available all the time. It therefore becomes more difficult and practically almost impossible to relocate the HSM device out of a specific area, without the capability to also forge and duplicate all the possible radio tags monitored by the HSM device, e.g., the EM location signature.

The values of the network parameters may be provided by the network element which may be a fixed facility e.g. WLAN access point, cell phone antennas, GPS. Since those facilities change very rarely in time (in months, years, even decades), they are therefore more reliable.

According to one embodiment, the set of network parameters uniquely identify the electronic device. The network parameter may uniquely identify the operating conditions or working environment of the HSM device. The network parameter may for example indicate the position of the device using GPS coordinates in combination with the SSID of the WIFI to which the HSM device is connected in the predefined state. This may have the advantage of further increase the tamper resistance of the HSM device.

According to one embodiment, the method further comprises storing the determined parameter values as reference values, wherein detecting the tampering state of the electronic device comprises: determining current values of the set of parameters and comparing the reference values with the current values of the set of parameters; determining that the at least part of the current values do not match the corresponding reference values. This embodiment may provide a reliable method for detecting the tampering state and may thus further increase the tamper resistance of the HSM device.

In another example, the reference values may be predefined such that the detecting of the tampering state may be performed by comparing the determined values of the set of parameters with the predefined reference values, e.g., the designated EM signatures at a given time. Also the rate of the local EM signature change may be bounded, e.g., some of local WLANs and GSM/LTE may change in ID, power (e.g., rain, maintenance), channels—but not all, and not simultaneously.

According to one embodiment, the comparing of the reference values with current values of the set of parameters comprises: associating each parameter of the set of parameters a respective predefined weight; comparing each reference value with the corresponding current value, and scoring the comparison result based on the weight associated with that reference value; using the set of scores for determining that the current values do not match the reference values. For example, parameters indicative of the same network (e.g. GSM parameters) may be assigned the same weight. Scoring the comparison result for a given parameter may for example comprise multiplying the weight associated with the given parameter by 1 if the comparison succeeded or multiplying the weight by 0 if the comparison failed for obtaining a score. "Comparison failed" means that a reference value and its corresponding current value do not match each other e.g. are not the same. The weights may for example be changed on a periodic basis depending on the conditions of the networks. For example, the network conditions of a network may change e.g. may be less secure in a given point of time, for the associated weighted may be loosen and the associated network parameter may not rely on compared to other secure networks. This embodiment may thus further increase the tamper resistance of the HSM device compared to the case where the network parameters are treated equally.

For example, different parameters can be weighted differently, e.g. GSM is weighted higher than WLAN or different GSM service providers are weighted differently, or different signal strengths can be taken into account of the weighting. For example, the most vulnerable network may be assigned the lowest weight as the values of its parameters may change more frequently compared to a secure network. The weight may further depend whether the respective network is publically or privately maintained. For example, the public network may have higher weight compared to the private network.

According to one embodiment, the determining that the current values do not match the reference values comprises calculating a sum of the set of scores, comparing the sum to a predefined threshold and determining that the current values do not match the reference values, wherein the threshold is adapted on a regular basis.

According to one embodiment, the value of each parameter (or at least part of) of the set of parameters is determined by a respective chipset or receiver of the electronic device, the detecting of the tampering state comprising controlling the set of chipsets or receivers to work in accordance with a consensus algorithm using the parameter values to detect the tampering state using the consensus algorithm. Using the consensus algorithm, the chipsets may reach an agreement on a common scalar value by exchanging values and summing them by a convex combination.

The usage of the consensus algorithm may allow the set of chipsets to work as a coherent group that can survive the failures of some of its members.

The chipsets may be configured to compare their parameter values with the corresponding reference values. Then each chipset may define a decision based on the comparison that the chip set has performed. For example, if the comparison is failed the chipset may define value S different from zero; otherwise it defines value S=0. The consensus algorithm may be configured using one or more conditions or requirements. A condition may for example comprise "If all chipsets receive the same value of S, then they must all output that value".

A consensus algorithm may for example comprise e PBFT, Raft, PoW or PoS algorithms.

According to one embodiment, the consensus algorithm utilizes an overall scoring function for evaluating an overall score based on the difference between each current parameter value and the corresponding determined parameter value, and for comparing the overall score with a predetermined tamper threshold. For example, of the overall score is higher than the tamper threshold the tampering state may be detected. This embodiment may provide a controlled method for managing the security of the stored keys in the HSM device. According to one embodiment, the tamper threshold is adapted or changed on a regular basis. For example, the tamper threshold may be reduced in case a highest tamper resistance is required and vice versa.

According to one embodiment, the determining of the values of the set of parameters (in the predefined state) is performed on a predefined periodic basis. The determined values of the set of parameters that are initially or firstly evaluated may be used as reference values. If for example, a given parameter value has been determined in following iterations and the given parameter value is different from the corresponding reference value, that reference value may be adapted to the given parameter value only if the number of successive iterations in which the given parameter value has been determined is higher than a predefined threshold e.g. 2. This may allow a persistent change by monitoring the change and its rate over a longer period.

This may further increase the tamper resistance of the HSM device as the determined parameter values are up-to-date, in particular if the determined values are used as reference values as described above.

According to one embodiment, the set parameters comprising parameters selected from a predefined set of parameters such that the number of parameters is higher than a predefined minimum number of parameters. The higher the number of parameters the highest the tamper resistance of the HSM device is. The selection may be a random selection which may make it impossible to guess the monitored parameters externally.

According to one embodiment, the determining of the values of the set of parameters being iteratively performed on a predefined periodic basis, wherein in each iteration the set of parameters is different from the set of parameters of the previous iteration. This may provide a method that may not be predictive and may thus increase the tamper resistance of the HSM device compared to the case where the same set of parameters is used in all iterations.

According to one embodiment, the network parameter comprises at least one of a wireless network identifier, signal strength, channel, frequency, base station of the network that services the electronic device, a group ID indicating a network identifier for a working group of devices including the electronic device. For example, if the HSM electronic device is in a state different from the predefined state (e.g. it is moved from its position defining the predefined state) the group ID may not be valid anymore if the group of devices are not moved also with the HSM electronic device as the group ID may be assigned to the HSM electronic device if it is together or in proximity (e.g. within few meters) of the other devices of the working group.

According to one embodiment, wherein the wireless network supports a wireless protocol of LTE, 3GPP, Wi-Fi, Bluetooth, and/or WiMax. This may provide a flexible method for use in different wireless communication environments.

According to one embodiment, the method further comprises selecting each parameter of the set of parameters by a respective chipset of the HSM electronic device, wherein the chipset comprises multiple parameters among which the each parameter is selected. For example, the HSM electronic device comprises chipsets where each chipset is configured to measure one or more network parameters. Each chipset may select among the one or more parameters that can measure all or part of them in order to be part of the set of parameters. The selection may for example be a random selection. In this case, only the chipset knows which parameter is used.

In one example, a unique ID of the HSM electronic device may be generated using the values of the set parameters (that may or may not be the reference values). For example, the values of the set of parameters may be hashed to provide a unique ID of the HSM electronic device. The unique ID may be used for example to provide a root of trust where for example the client or host computer that can communicate with the HSM device has to provide an ID identical to the unique in order to use the HSM electronic device e.g. the client may be constrained to in the same environment (in proximity) of the HSM device in order to use the HSM electronic device.

In one example, radio tags or parameter values—hashed or equivalent—may be integrated into the internal certification, and thus providing the entire system to authenticate its physical location. For that a compound network with several HSMs may be used. This may provide a certificate which is location bound and provide the system another root of trust. For example, the HSM electronic device may share the unique ID with other HSM devices forming a network with the HSM electronic device. The other HSM devices may be configured for performing the methods as described herein for the HSM electronic device e.g. each HSM device may use a respective set of network parameters. The HSM devices may exchange their unique IDs so as to cross certify each other e.g. to cross check that they are all present in their respective predefined or initial state or initial location. This may increase the bandwidth of radio signals being simultaneously monitored. For example, a HSM device X may measure or determine a GSM parameter being a first network operator of the GSM network, while a HSM device Y determines the GSM parameter being a second network operator of the GSM network. The IDs that are built based on those parameter values may be exchanged (e.g. in a predefined time period) between the HSM devices X and Y for cross certifying each other e.g. Device X (Y) may determine that device Y (X)'s ID matches its own ID or matches a predefined reference ID. If for example, device X determines that the received Y's ID is not succeeding the comparison or if the Y's ID is not received at all within the predetermined time period this may be an indication of a tampering state and a tamper detection state signal may be generated accordingly by device X.

Figure 1:
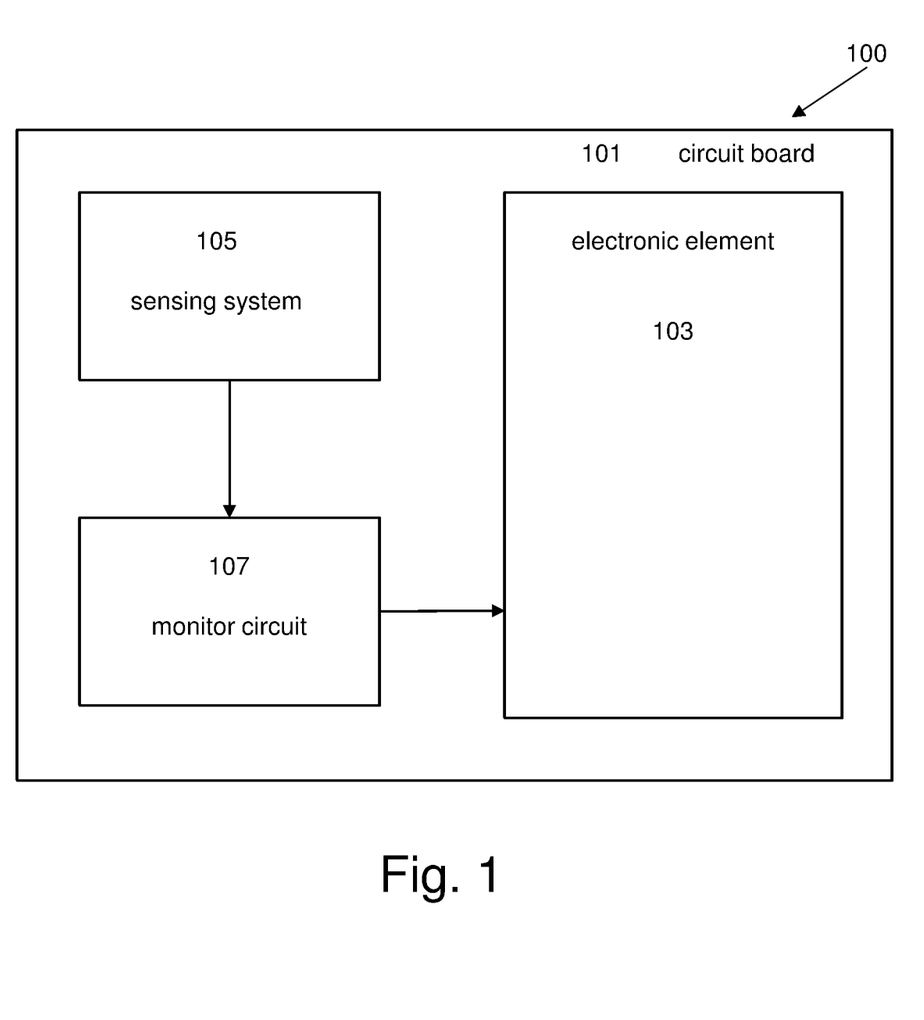
FIG. 1 is a block diagram of a tamper resistant system in accordance with an example of the present disclosure.

FIG. 1 depicts a tamper resistant or respondent system 100 in accordance with an example of the present disclosure. Tamper resistant system 100 may for example be a HSM device or a card device that stores data that needs protection.

Tamper resistant system 100 includes a circuit board 101 having components 103-107 disposed thereon. Components 103 may be one or more electronic elements, wherein some or all of the electronic elements may need protection. For example, electronic element 103 may comprise an encryption engine having a store for keys that need to be protected. Component 105 may comprise a sensing system for detecting a tampering state of the tamper resistant system 100 in accordance with an example of the present method. The sensing system 105 is further described in detail with reference to FIG. 2.

In use, if there is an attempt to tamper the system 100, the sensing system 105 may trigger a state change by for example sending an appropriate signal to a monitor circuit 107. If this state change occurs then it will erase or destroy any information contained a predefined security perimeter. The security perimeter may for example comprise components 103. In another example, the security perimeter may further comprise monitor circuit 107 and/or at least part of sensing system 105 (e.g. antenna of sensing system 105 shown below may be outside the security perimeter).

The sensing system 105 may be provided as an on-chip component that is built on the circuit board itself. In another example, the sensing system 105 may be off-chip component that may be a discrete component that is not built on the circuit board 101. The on-chip component may have the advantage of providing a good matching and may reduce required connections compared to the off-chip. The off-chip component may have the advantage of providing a flexible system that may be adapted or used with multiple systems to be protected. Although shown separate the sensing system 105 and component 103 may form a single component in another example.

Figure 2:
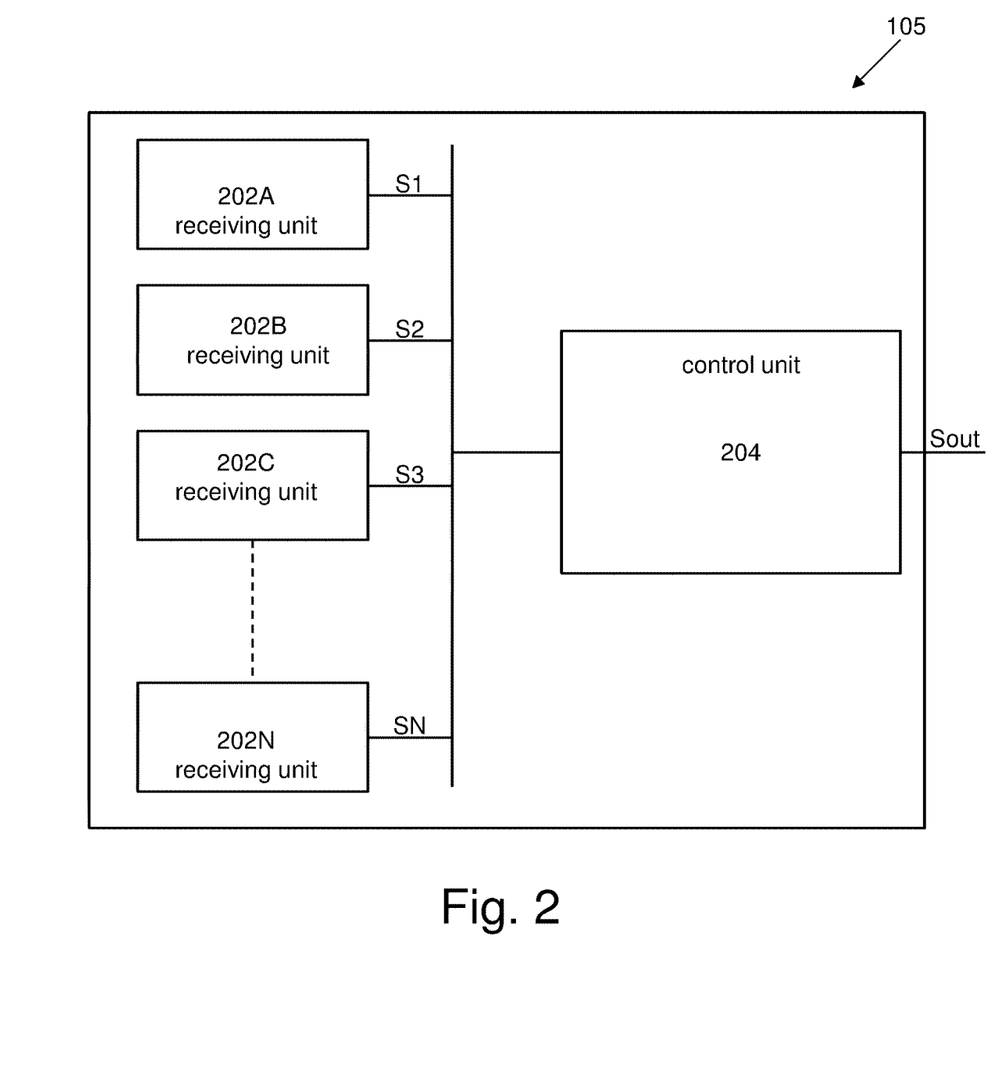
FIG. 2 shows an example structure of a sensing system for detecting a tampering state.

FIG. 2 shows an example structure of the sensing system 105 for detecting a tampering state in accordance with an example of the present disclosure. The on-chip (or off-chip) sensing system 100 includes a plurality of receiving units 202A-N (or radio sensors) such as wireless receivers. For example, the receiving unit 202A may comprise a WIFI receiver for receiving WIFI signals e.g. from an access point. The receiving unit 202B may comprise a GPS receiver for receiving GPS signals e.g. from a beacon transmitter of a GPS network. The receiving unit 202C may comprise a Bluetooth receiver for receiving Bluetooth signals from a Bluetooth device forming a personal area network with the tamper resistant system. In another example, the sensing system may additionally comprise a physical tamper detection sensor, e.g. a resistive mesh.

Each receiving unit 202A-N is configured for receiving and interpreting signals e.g. RF signals. The receiving units 202A-N are operable to search or process received signals for network parameters. The network parameters to be evaluated may for example predefined such that the processing of the received signals may evaluate the predefined parameters only. For example, a network parameter may comprise an identifier unique to the sensing system 105 or to the tamper resistant system 100 that uniquely identify the tamper resistant system 100 within a network. The identifier may be an International Mobile Subscriber Identity (IMSI), Temporary International Mobile Subscriber Identity (TIMSI), International Mobile Equipment Identity (IMEI), Medium Access Control (MAC) address or similar.

The receiving units 202A-N may support a coexistence interface, such that, for example, coexistence information may be exchanged such as information indicating "receiving unit 202A is busy sending or receiving data"; "receiving unit 202B is busy sending or receiving data"; "receiving unit 202B has a high priority message to send" etc.

In one example, a control unit 204 is used to incorporate all generated tamper resistance signals (S1 to SN) from the receiving units and provide an output signal Sout to trigger an electrical state change of the tamper resistant system 100. The signal Sout may for example be sent to the monitor circuit 107. For example during normal operation, the signal Sout=0. The control unit 204 may for example be an OR gate that is used to incorporate all generated signals (S1 to SN) and provide the output signal Sout.

In another example, the control unit 204 being for example a micro controller may receive or collect from receiving units 202A-N the values of the parameters and may make a final decision for Sout by comparing the values of the received parameters with their corresponding reference values. For example, the control unit 204 may call over e.g. Hayes command set (telecommunication) or e.g. NMEA protocol (GPS) the according parameters from the receiving units 202A-N.

Although FIG. 2 shows multiple receiving units each associated with a corresponding wireless technology, the sensing system 105 may comprise a receiving unit that can be used for more than one wireless technology. For example, the receiving unit 202A may be used for processing both WIFI and Bluetooth signals.

Figure 3:
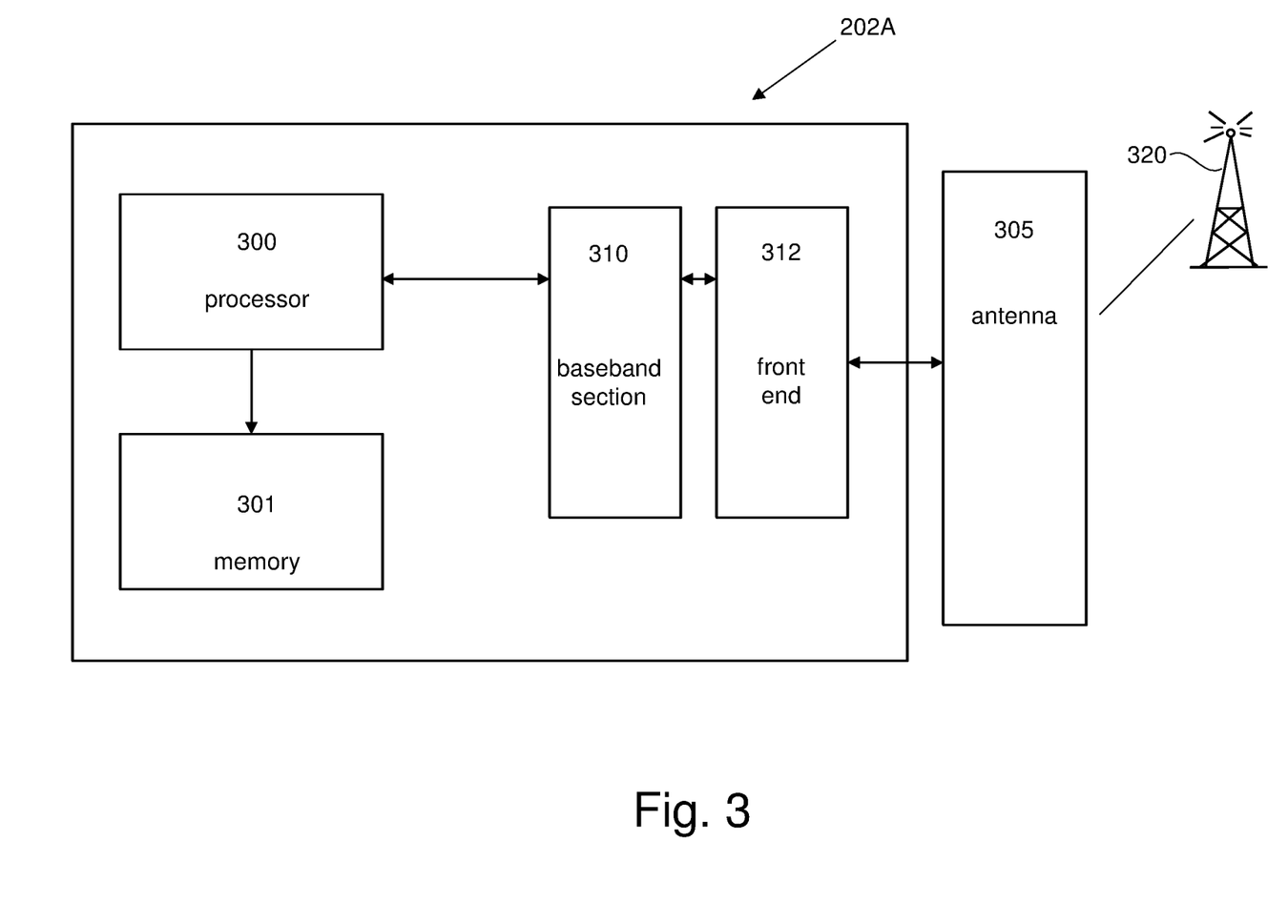
FIG. 3 is a diagram giving one example of a circuitry of a receiving unit of the sensing system.

FIG. 3 is a diagram giving one example of a circuitry of a receiving unit e.g. 202A of the sensing system 105 in accordance with the present disclosure. The tamper resistant system 100 may be connected or may be part of one or more networks such as wireless networks. The wireless network may for example comprise a personal area network (WPAN), WLAN, LTE, GSM etc.

The receiving unit 202A may include a processor 300 which controls at least part of the operation of the receiving unit 202A. Memory 301, which may include both read-only memory (ROM) and random access memory (RAM), provides instructions and data to the processor 300. A portion of the memory 301 may also include non-volatile random access memory (NVRAM). The processor 300 typically performs logical and arithmetic operations based on program instructions stored within the memory 301. The instructions in the memory 301 may be executable to implement at least part of the methods described herein.

The processor 300 in turn sends and receives data and commands with a baseband section 310 (e.g. a wireless baseband). The baseband section 310 may comprise Media Access Controller (MAC) and Base Band (BB) units. These may be implemented either using one or two separate integrated circuits, or alternatively integrated along with the processor 300 into a single integrated circuit chip. Alternatively, baseband section 310 may connect to processor 300 using various types of personal computer (PC) interfaces, such as mini-PCI, PCI, or other interface. The baseband section 310 may perform baseband operations such as connection setup, equalization, frequency hopping, timing recovery, correlation, decodification etc. and may implements various schemes in order to recover the original signal or information which has been transmitted. The baseband section 310 may for example be implemented using a digital signal processor (DSP) or using on purpose-built hardware such as application-specific integrated circuit (ASICs).

The baseband section 310 in turn sends and receives data and commands with the Radio frequency (RF) front end 312. The RF front end 312 can for example contain one or more Wireless-LAN Radio Frequency integrated circuits (IC or RFIC), power amplifiers, Low Noise Amplifiers (LNAs), Mixers, RF switches, and the like.

Antenna 305 may be attached to the receiving unit 202A and coupled (e.g. electrically coupled) to the RF front end 312. Antenna 305 may be a single antenna, multiple antennas, multiple antenna elements or an array to receive radio signals such as directional beacons transmitted from an access point as illustrated by component 320. In one example, the antenna 305 may have one or more desired ranges of frequency. A range of frequency may cover GSM (1800 MHz & 1900 MHz), UMTS (2100 MHz), Bluetooth and Wi-Fi (2.4 GHz), and/or LTE system (2.3 GHz, 2.5 GHz, and 2.6 GHz).

The antenna 305 may for example be a WIFI, Bluetooth and/or GPS antenna. The antenna 305 may further comprise a single multiband or wideband antenna to cover all the frequencies of GSM, UMTS and LTE. The antenna 305 may in some cases be contained within the same enclosure as the host board of the receiving unit 202A.

The RF front end 312 may be responsible for receiving (and transmitting) the radio frequency (RF) signal from the antenna 305 via a coupler and converting the RF signal to an intermediate frequency (IF) signal (inbound baseband signals) e.g. by utilizing one of a variety of down-conversion or demodulation techniques to convert the RF signals to inbound baseband signals. For example, on the receiving path an ADC block (not shown) may perform analog-to-digital conversion and a DDC block may perform digital-downconversion. The DDC block may for example perform modem operations, such as demodulation (also called digital tuning) of the (received) signal on the receive path.

Inbound RF signals are received by antenna 305 and coupled to RF front end 312. RF front end 312 then converts the inbound RF signals to inbound baseband signals, which are then coupled to baseband section 310. The inbound baseband signals are processed by baseband section 310 and inbound data is output from baseband module 310 to processor 300. For example, the received inbound RF signal may comprise a beacon signal that carries information. The information may comprise or indicate network parameters such as a SSID (Service Set Identification), MAC (Medial Access Control) address, ID code of the access point and RSSI (Received Signal Strength Indication). This information is then coupled to baseband section 310 and decoded to determine the values of the network parameters.

The various components of the receiving unit 202A may be coupled together by a bus system, which may include a power bus, a control signal bus, and a status signal bus in addition to a data bus.

Although shown together with the baseband section and the RF front end, in another example, the processor 300 and the memory 301 may be part of a separate component such as the control unit 204.

In another example, the RF front end 312 may be common between the receiving units 202A-N.

Figure 4:
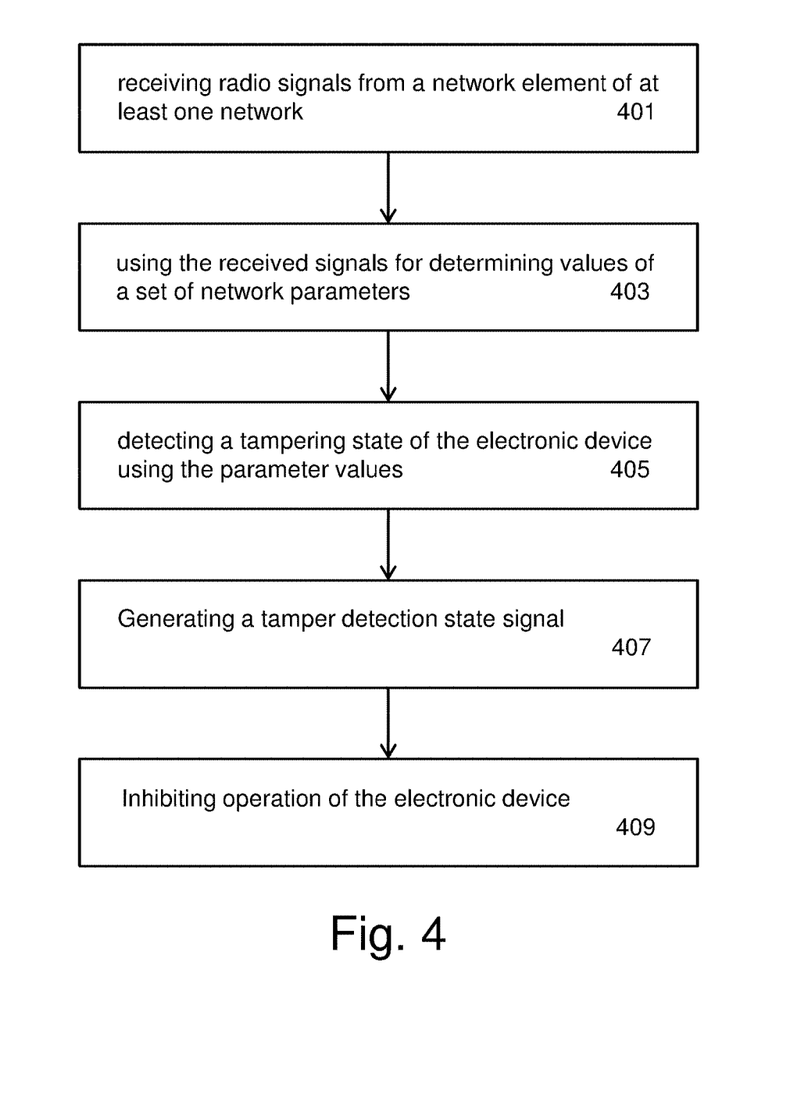
FIG. 4 is a flowchart of a method for resisting tampering in tamper resistant system.

FIG. 4 is a flowchart of a method for resisting tampering in tamper resistant system 100.

In step 401, one or more radio or wireless signals may be received (or detected) e.g. at the receiving units 202A-N from respective one or more sources. A source of the wireless signal may for example comprise a network's access point or a Bluetooth device. The wireless signals may be sent from the sources to the tamper resistant system 100 or may be broadcasted by the sources.

The receiving of the radio signals may for example be automatic. In another example, the receiving of the radio signals may be in response to scans for access points that are performed by the receiving units 202A-N. The scan may for example comprise passive searches for access points by searching for broadcast beacons from access points. And the access point with the best signal strength may be the received signal. This signal may be further processed.

Step 401 may be performed using a scanning process for discovering the surrounding access points. This scanning process comprises beacon signal detection and beacon signal information collection. During the process of beacon scanning, all the channels available may be scanned by selectively switching to each channel to detect beacon signal associated with the corresponding AP, and collects the beacon signal information sent from the one or more APs which has or have been thus detected.

Using the example of receiving units 202A and 202C being WIFI and Bluetooth receivers respectively. In case antenna 305 comprises a single wideband antenna that covers Bluetooth and WIFI frequencies and that is attached to both receiving units 202A and 202C, a combiner (and a splitter) based approach that enables simultaneous operation of receiving units 202A and C may be used for processing the received signals. Alternatively, a switch based approach that allows mutual exclusive operation of the receiving units 202A and 202C may be used. And in case antenna 305 comprises multiple antenna each connected to respective receiving units 202A and 202C, signal from only one selected antenna is fed to the corresponding receiving unit. Antenna selection may be based on which one provides the better signal quality. For example, the selected antenna is the antenna having the highest or the best signal quality.

The receiving of the radio signals may be performed simultaneously or over a given time period.

In step 403, the received radio signals may be used to determine values of a set of network parameters that identify the tamper resistant system 100 in a predefined state within the at least one network. The predefined state may be the normal operation state which is different from the tampering state. The predefined state may for example defined by the position of the tamper resistant system 100. In that position of the tamper resistant system 100 some predefined network parameters may have values that may be evaluated for that position. Those values may for example be reference values.

Step 403 may be performed for each received signal at a receiving unit 202A-N to which the received signal is routed. The one or more radio or wireless signals may be received when the tamper resistant system is in the predefined state.

The network parameters may comprise network parameters that are specific to each receiving unit or that can only be determined by a respective receiving unit 202A-N. For example, receiving unit 202A being a WIFI receiver may determine values for the SSID which the Bluetooth receiver 202C may not determine. The network parameters may alternatively or in addition comprise parameters that can be determined by multiple or all receiving units 202A-N. For example, a network parameter may comprise signal parameters that can be determined based on received channel, signal strength (RSS), time of arrival (TOA), time difference of arrival (TDOA), and angle of arrival (AOA) of the received signals.

Each received radio signal may be received as described above using the antenna of the respective receiving unit 202A-N. The received wireless signal may be downconverted to a lower frequency (e.g., baseband) and digitized. Digitized received signal may be processed (e.g. using OFDM modulation or CCK/DSSS modulation etc.). A packet may thus be demodulated and the received packet may be identified. The packet may be interpreted (e.g. using the processor 300). For example, the header of the identified packet may for example comprise the SSID of the signal source 320. The value of the SSID may then be determined. Other network parameters may also be evaluated using the identified packet.

For exemplification purpose assuming that three network parameters par1, par2 and par3 are to be determined. For example, par1 may be a SSID, par2 may be a GPS signal strength and par3 may be Bluetooth Tag. Thus, each of the parameters can be measured by the respective receiving unit e.g. 202A-C. For that, each of the receiving units 202A-202C may contain an instruction for measuring the values of the respective parameters par1-3.

The determined parameter values may be forwarded to the control unit 204 in case a combination of parameters values obtained from different receiving units is required in order to detect a tampering state. That is the packet that is output from each of the baseband sections of the receiving units 202A-C contains a value of the respective parameter par1-3. In another example, the parameter values may be maintained in each of the respective receiving units 202A-C.

The parameter values of step 403 may be stored as reference values since they are measured or determined in a predefined state (normal operation state) of the tamper resistant system 100 that is not a tampering state. For example, the values of par1-3 may be stored as refpar1, refpar2 and refpar3 respectively.

In step 405, a tampering state of the tamper resistant system 100 may be detected using the parameter values determined in step 403.

For example, after saving the determined parameter values as reference values in step 403, the receiving units 202A-N may be configured to regularly (e.g. every day or every week) scan or search for radio signals and (re) determine the parameter values e.g. of par1-3. The detection of the tamper state may be performed by comparing the currently measured parameter values with the respective reference values of the parameters. In case at least part of the current parameters values are different from the corresponding reference values, this may be an indication of the tampering state of the tamper resistant system 100. For example, the comparison may be performed by determining the difference between the current value and the respective reference value and if the difference is higher than a threshold this may be an indication that they are different. In case of numerical type parameter, the threshold may be equal or higher than zero. In case of a string type parameter, the threshold may be a predefined number of differentiating characters. That number may be equal or higher than zero. In another example, if it is determined that a currently measured parameter value is not the same as the respective reference value then they are different e.g. without using a threshold. In another example, if the network parameter comprises a network provider of the network and if the current value and the corresponding reference value refer to different network providers of that network, the comparison between the current value and the corresponding reference value may be successful (e.g. they match each other). In one example, a change normally deemed as tamper detected could be marked within a time window as false positive by a certification authority according to a pre-established protocol, to prevent the frequent alarms associated with an overly dynamic EM region. In other words, if the tampering state is detected as described above, a further condition as defined by the certification authority may be checked. The further condition may indicate that the tempering state is not to be triggered if it is detected within the time window.

For example, the set of parameters may comprise multiple subsets of parameters, wherein each subset of parameters corresponds or is indicative of a respective network (e.g. GSM or UMTS). In this case, the comparison may be performed subset by subset or network per network. That is, the current values of the subset of parameters of a given network e.g. GSM, are compared to their corresponding reference values. If at least one of the parameters of that subset has failed the comparison then that subset may be determined as being different from its corresponding subset. In an alternative example, only if all parameters of that subset have failed the comparison then that subset may be determined as being different from its corresponding subset. This comparison method may be performed for each of the multiple subsets and the results of the comparisons at the subset level may be combined to determine whether there is a tampering state or not. The combination may be performed e.g. using a weighted combination as described herein.

Using the above example, the tampering state is detected in the following cases. In a first case, which is labelled herein as case A, if all current parameter values of par1-3 are different from their respective reference values refpar1-3. For that, the control unit 204 may be used to combine the comparison results of the three parameters par1-3. Based on the combination it may determine that all current parameters values par1-3 do not match corresponding reference values refpar1-3. The comparison may be performed at the control unit 204 if the reference values are stored therein and if the current parameter values are received at the control unit 204 from the receiving units 202A-C. Alternatively, the comparison may be performed at the receiving units. For example, receiving unit 202A may compare current value of par1 with refpar1. Receiving unit 202B may compare current value of par2 with refpar2 and receiving unit 202C may compare current value of par3 with refpar3, wherein each of the receiving units 202A-C stores locally the respective reference values refpar1-3. The result of the comparison in each receiving unit 202A-C may be sent by the receiving units to the control unit 204 that would combine them. The results of comparison may be sent in form of signals S1-S3, wherein S1-S3 is different from 0 to indicate that the comparison failed.

In another case, which is labeled herein as case B, the tampering state may be detected if at least one parameter value e.g. par1 is different from its respective reference value refpar1. For that, the signal output S1 of the receiving unit 202A may be different from zero if the comparison is performed at the receiving unit 202A. The signal S1 may be sent to the control unit 204.

In step 407, a tamper detection state signal may be generated responsive to the detected tampering state. The tamper detection state signal may for example be generated by the control unit 204 as Sout to indicate the tampering state. Alternatively, each receiving units 202A-N may generate a tamper detection state signal if the comparison that is performed locally in that receiving unit has failed. For example, in the above case A) the control unit 204 may output Sout to monitor circuit 107 which is different from zero to indicate that there is a tampering state. In above case B) the signal S1 may be sent directly to the monitor circuit 107 to indicate that there is a tampering state.

In step 409, the monitor circuit 107 may inhibit operation of the tamper resistant system 100 responsive to the tamper detection state signal. The inhibiting may for example comprise erasing the content of the memory (e.g. comprising keys) of the tamper resistant system 100 for preventing normal operation or erasing the whole content of the tamper resistant system 100. In another example, the inhibiting may comprise disabling parts or all of the tamper resistant system 100.

Figure 5:
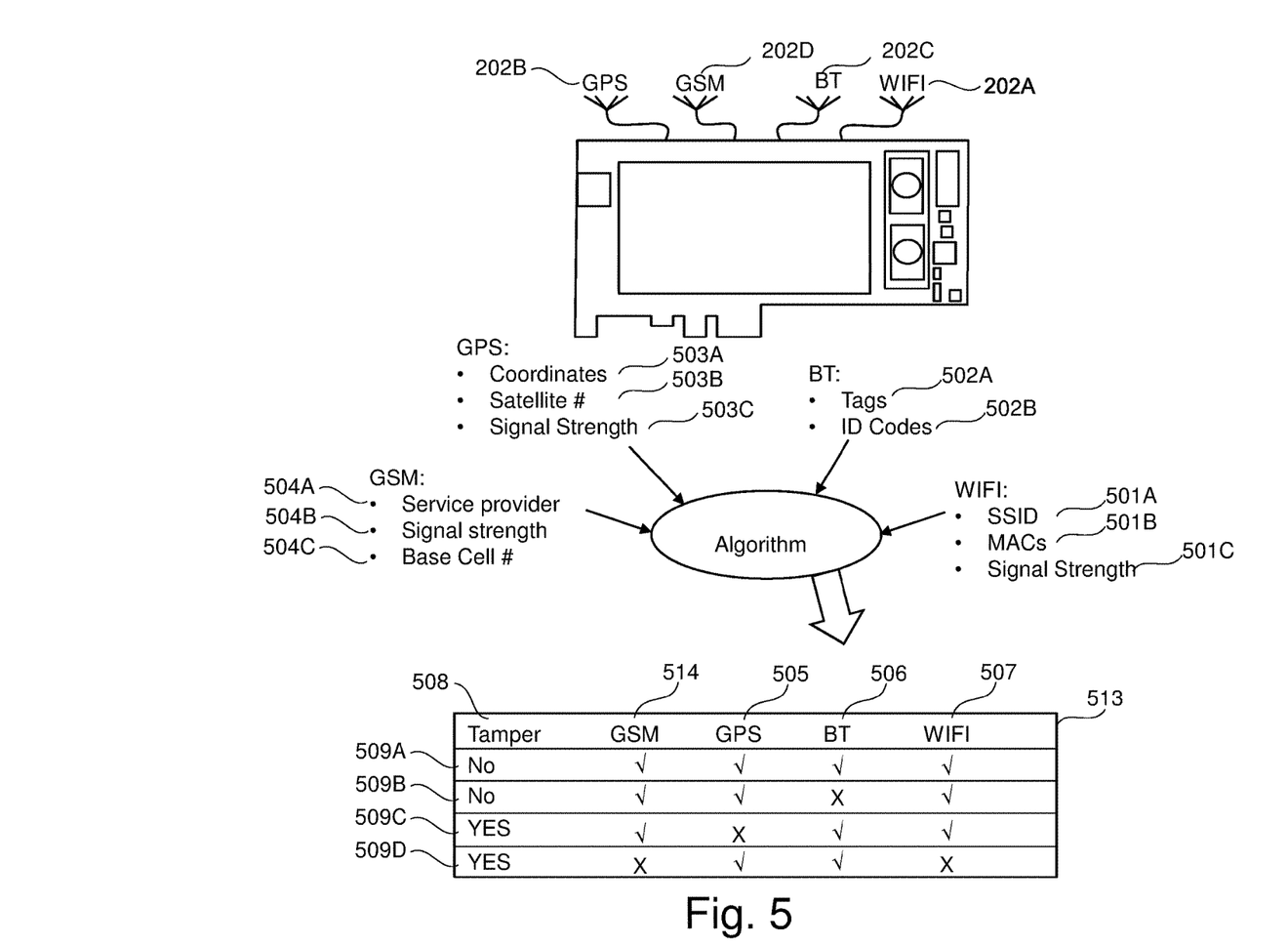
FIG. 5 illustrates a method for combining network parameters values in order to detect the tampering state.

FIG. 5 illustrates a method for combining the parameters values e.g. at the control unit 204 in order to detect the tampering state. The parameter values may for example be determined as described in step 403.

In this example, the sensing system 105 may comprise receiving units 202A-D, wherein 202A-C, as exemplified above, comprise WIFI, GPS and Bluetooth receivers respectively. Receiving unit 202D may comprise a GPS receiver for receiving GPS signals.

FIG. 5 lists examples of network parameters that can be measured by the receiving units 202A-D.

For example, the network parameters may be specific to each of the wireless technologies. The network parameters may comprise SSID 501A, MAC address 501B and the signal strength 501C that may be measured by the receiving unit 202A. The network parameters may further comprise Bluetooth Tags 502A and ID codes 502B that may be measured by the receiving unit 202C. The network parameters may further comprise GPS coordinates 503A of the tamper resistant system 100, satellite number or ID 503B of the satellite that services the tamper resistant system 100 the GPS signal strength 503C that may be measured by the receiving unit 202B compared to the reference GPS fix, or set of fixes, stored in the HSM. The network parameters may further comprise the service provider 504A that provides network access to the tamper resistant system 100, GSM signal strength 504B and the base cell or base station number or ID 504C of the base station that services the tamper resistant system 100 that may be measured by the receiving unit 202D.

As described above with reference to FIG. 4, reference values of the parameters 501A-504C may be determined e.g. in step 403 at time T0 in the normal operation state of the tamper resistant system 100. And the values of the network parameters 501A-504C may regularly be (re)evaluated e.g. at times T1, T2, T3 and T4 after the reference values of the parameters 501A-504C have been determined.

The re-evaluated parameter values may be compared with the reference values. The result of the comparisons may then be combined e.g. at the control unit 204 in order to detect a tampering state of the tamper resistant system 100. For that a data structure as illustrated by matrix 513 may be created and maintained by the control unit 204. The data structure 513 may for example be a data table having columns or fields 505-507 and 514 each associated with the network technology being used. For example, field 514 comprises values that represent GSM. Field 505 comprises values that represent GPS. Field 506 comprises values that represent Bluetooth. Field 507 comprises values that represent WIFI. The data table 513 further comprises a field 508 having values of attribute "Tamper" to indicate the state of the tamper resistant system 100. The value "No" indicates that there is no tampering state, while value "YES" indicates the tampering state of the tampering resistant system 100.

The data table 513 may comprise a number of rows or records that is equal to the number of times the networks parameters 501A-504C have been re-evaluated (and compared with their reference values). In this example, the networks parameters 501A-504C have been re-evaluated 4 times at times T1-T4. Each time the networks parameters 501A-504C have been re-evaluated they are compared with their reference values. For example, the networks parameters 501A-504C may be re-evaluated at time T1, and the comparisons may be performed once the parameter values are all determined e.g. at T1+ΔT1. The networks parameters 501A-504C may be re-evaluated again at time T2>T1+ΔT1. The networks parameters 501A-504C may be re-evaluated again at time T3>T2+ΔT2. The networks parameters 501A-504C may be re-evaluated again at time T4>T4+ΔT4. ΔT1-4 may be the time required to evaluate or determine the values of the network parameters and to detect if there is a tampering state or not.

In one example, the comparisons may be performed as described above with reference to FIG. 4. In this example of FIG. 5, network parameters (e.g. 501A-C) specific to each of the wireless technologies may be compared with their reference values and the results of comparisons is combined to determine whether the re-evaluated parameters match or not the reference values for that specific technology. The combined result of the comparisons may be indicated in the data table 513 e.g. by storing value 0 or 1, wherein values 0 and 1 indicate that the comparison has failed or succeeded respectively. For example, the cross sign in table 403 is used to illustrate that the comparison has failed. The tick sign is used to illustrate that the comparison has succeeded.

For example, the re-evaluated values of the parameters 501A-C of the WIFI technology may be compared with their reference values. In case at least one re-evaluated value e.g. of parameter 501A does not match the corresponding reference value the combined result of the comparisons may be indicated by a cross sign in table 513; otherwise if all the re-evaluated values of parameters 501A-C match their corresponding reverence values the combined result of the comparisons may be indicated by a tick sign in table 513. The comparisons for each of the other technologies GSM, GPS and Bluetooth may be performed in the same manner.

After comparing all the re-evaluated values of parameters 501A-504C for each technology separately, the corresponding raw of the data table 513 is filled with values indicating the results of the comparisons. The control unit 204 (e.g. in accordance with a given algorithm) may then use the combination of these values of the raw to decide whether the tamper resistant system 100 is in a tampering state or not.

For example, values in row 509A indicate that all re-evaluated parameters match their corresponding reference values and thus there is no tampering state. Thus the value of the attribute "Tamper" is set to "No".

Values of row 509B indicate that the re-evaluated parameters of GSM, GPS and WIFI match their corresponding reference values; however, the re-evaluated parameters of Bluetooth do not match their corresponding reference values. Nevertheless, in this case, the control unit 204 may decide that the tamper resistant system 100 is not in a tampering state. For example, the result of comparisons may be combined using a weighing method. The weighting method may comprise associating to each technology a weight. In this example, the Bluetooth technology has assigned the lowest weight.

For example, GSM may be assigned a weight=0.6. GPS may be assigned a weight=0.8. WIFI may be assigned a weight=0.9 and the Bluetooth may be assigned a weight of 0.2. The results of comparisons may for example be combined by a linear weight method in order to obtain a combined value as follows: 0.6*1+0.8*1+0.2*0+0.9*1.=2.3. The combined value is then compared with a predefined tampering threshold (e.g. 2). Based on the comparison result the control unit 204 may detect the tampering state. In this example, since the combined value 2.3 is higher than 2, there is no tampering state. For that the value of the attribute "Tamper" is set to "No" in row 509B.

However, for rows 509C-D the combined values resulting from the weighing method are 1.7 and 1 respectively and thus are smaller than the tampering threshold of 2. The control unit 204 may thus indicate the detection of the tampering state of the tamper resistant system 100. For that the value of the attribute "Tamper" is set to "YES" in rows 509C-D.

As described above, values of row 509B indicate that the re-evaluated parameters of Bluetooth do not match at least in part their corresponding reference values. The low weight assigned to Bluetooth may be due to the fact that its parameters may frequently change for technical purpose. That is, a change in a parameter value of Bluetooth may mostly be due to the technical change and not to a tampering act. In this case, the reference values of the one or more parameters of Bluetooth 502A-B, whose values do not correspond with their corresponding reference values may be replaced or updated using the new obtained values. For example, if the determined value or current value of parameter 502A is different from the corresponding reference value, that reference value may be replaced by the current value e.g. if the tampering state is not detected with that new value. The low weight assigned to Bluetooth with respect to tamper detection may be compensated by using more Bluetooth networks, each of lower (sub)weight; their main role is in deciding for "no tamper" conditions, in the case of marginal changes of e.g., GSM, GPS.

However, if another parameter such as GSM parameter 504C has changed such that its current value is different from the corresponding reference value, this may be an indication of a tampering state as such parameters do not frequently change. The reference value of 504C can be replaced by the current value if for example that current value is repeatedly obtained or determined over a predefined time period. Another example may be a hosting server that might integrate a fixed Bluetooth sender. Over time the HSM device would lock into this automatically and thus having a "strong" relation between the hosting server and the HSM device where values of the Bluetooth parameters may not change frequently for technical purpose and thus the updating method described for GSM may be used.

In other words, categories that can frequently change e.g. human configurable IDs like SSID, if according HW-IDs like MAC do not change this parameter is changed after only few cycles. Categories that should not frequently change e.g. HW-IDs (GSM cell base station IDs) only after a long period of observation this will be accepted as changed. In this period an additional change might tamper the system.

Possible combination of features described above can be the following. A method for resisting tampering in a HSM electronic device, the method comprising: receiving radio signals from a network element of at least one network; and using the received radio signals for determining values of a set of network parameters that identify the electronic device in a predefined state (e.g. of "trusted electromagnetic geolocation signature") within the at least one network. The determined values may be referred to or defined as a "trusted electromagnetic geolocation signature." The method further comprises: detecting a tampering state of the electronic device using the parameter values (e.g. of the "trusted electromagnetic geolocation signature"); generating a tamper detection state signal responsive to the detected tampering state; and inhibiting operation of the electronic device responsive to the tamper detection state signal.

The method can further include the set of network parameters uniquely identify the electronic device (or the "trusted electromagnetic geolocation signature" of the electronic device).

The method can further include storing the determined parameter values as reference values (e.g. of the "trusted electromagnetic geolocation signature"), wherein detecting the tampering state of the electronic device comprises: determining current values of the set of parameters and comparing the reference values with the current values of the set of parameters; and determining that the at least part of the current values do not match the corresponding reference values (e.g. of the "trusted electromagnetic geolocation signatures").

The method of can further include comparing of the reference values with current values of the set of parameters comprising: associating with each parameter of the set of parameters a respective predefined weight; comparing each reference value with the corresponding current value; scoring the comparison result based on the weight associated with that reference value (e.g. of the "trusted electromagnetic geolocation signature"); and using the set of scores for determining that the current values do not match the reference ("trusted electromagnetic geolocation signature") values.

The method can further includes determining that the current values do not match the reference values comprising calculating a sum of the set of scores, comparing the sum to a predefined threshold and determining that the current values do not match the reference values.

The method can further include the threshold being adapted on a periodic basis.

The method can further include the value of each parameter of the set of parameters determined by a respective chipset of the electronic device, the detecting of the tampering state comprising controlling the set of chipsets to work in accordance with a consensus algorithm using the parameter values to detect the tampering state.

The method can further include the consensus algorithm utilizing an overall scoring function for evaluating an overall score based on the difference between each current parameter value and the corresponding determined parameter value, and for comparing the overall score with a predetermined tamper threshold.

The method can further include the tamper threshold being adapted on a regular or periodic basis.

The method can further include determining of the values of the set of parameters being performed on a predefined periodic basis.

The method can further include the set parameters comprising parameters being selected from a predefined set of parameters such that the number of parameters is higher than a predefined minimum number of parameters.

The method can further include the determining of the values of the set of parameters being iteratively performed on a predefined periodic basis, wherein in each iteration the set of parameters is different from the set of parameters of the previous iteration.

The method can further include network parameter comprising at least one of a wireless network identifier, signal strength, base station of the network that services the electronic device, a group ID indicating a network identifier for a working group of devices including the HSM electronic device.

The method can further include the wireless network supporting a wireless protocol of LTE, 3GPP, Wi-Fi, Bluetooth, and/or WiMax.

The method can further include selecting each parameter of the set of parameters by a respective chipset of the electronic device, wherein the chipset comprises multiple parameters among which the each parameter is selected.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for resisting tampering in a HSM electronic device, the method comprising:
   receiving radio signals, at a sensing system of the HSM electronic device, from a network element of at least one network;
   using the received radio signals for determining values of a set of network noise parameters as reference values that identify the HSM electronic device during normal operation in a predefined state within the at least one network;
   determining current values of the set of network noise parameters of the HSM electronic device and comparing the reference values determined during normal operation with the current values to determine if there are matching levels of noise;
   detecting a tampering state if there are not matching levels of noise, via the sensing system of the HSM electronic device, of the HSM electronic device;
   identifying a plurality of device identification tags within range of a receiver of the HSM electronic device;
   comparing the plurality of device identification tags to a predefined set of expected device identification tags;
   detecting the tampering state if the plurality of device identification tags do not match the predefined set of expected device identification tags;
   generating a tamper detection state signal responsive to the detected tampering state and the sensing system transmitting the tamper detection state signal to a monitoring circuit of the HSM electronic device; and
   in response to transmitting the tamper detection state signal to the monitoring circuit of the HSM electronic device, the monitoring circuit preventing normal operation of the HSM electronic device.

2. The method of claim 1, wherein the set of network parameters uniquely identify the HSM electronic device.

3. The method of claim 1, further comprising storing the determined parameter values and determining that part of the current values do not match the corresponding reference values.

4. The method of claim 3, wherein the comparing of the reference values with current values of the set of parameters comprises:
   associating with each parameter of the set of parameters a respective predefined weight;
   comparing each reference value with the corresponding current value;
   scoring the comparison result based on the weight associated with that reference value; and
   using the set of scores for determining that the current values do not match the reference values.

5. The method of claim 4, wherein the determining that the current values do not match the reference values comprising calculating a sum of the set of scores, comparing the sum to a predefined threshold and determining that the current values do not match the reference values.

6. The method of claim 5 further comprising the threshold being adapted on a periodic basis.

7. The method of claim 1, wherein the value of each parameter of the set of parameters is determined by a respective chipset of the HSM electronic device, the detecting of the tampering state comprising controlling the set of chip sets to work in accordance with a consensus algorithm using the parameter values to detect the tampering state.

8. The method of claim 7, wherein the consensus algorithm utilizes an overall scoring function for evaluating an overall score based on the difference between each current parameter value and the corresponding determined parameter value, and for comparing the overall score with a predetermined tamper threshold.

9. The method of claim 8 further comprising the tamper threshold being adapted on a periodic basis.

10. The method of claim 1 further comprising the determining of the values of the set of parameters being performed on a predefined periodic basis.

11. The method of claim 1 further comprising the set parameters comprising parameters being selected from a predefined set of parameters such that the number of parameters is higher than a predefined minimum number of parameters.

12. The method of claim 1 further comprising the determining of the values of the set of parameters being iteratively performed on a predefined periodic basis, wherein in each iteration the set of parameters is different from the set of parameters of the previous iteration.

13. The method of claim 1, wherein the network parameter comprising at least one of a wireless network identifier, signal strength, base station of the network that services the HSM electronic device, or a group identification indicating a network identifier for a working group of devices including the HSM electronic device.

14. The method of claim 13, wherein the wireless network supports a wireless protocol.

15. The method of claim 1 further comprising selecting each parameter of the set of parameters by a respective chipset of the HSM electronic device, wherein the chipset comprises multiple parameters among which the each parameter is selected.

* * * * *